US011674821B2

(12) United States Patent
Kech

(10) Patent No.: US 11,674,821 B2
(45) Date of Patent: Jun. 13, 2023

(54) FIELD DEVICE WITH MOUNTING ADAPTER

(71) Applicant: VEGA Grieshaber KG, Wolfach (DE)

(72) Inventor: Guenter Kech, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 328 days.

(21) Appl. No.: 16/880,759

(22) Filed: May 21, 2020

(65) Prior Publication Data

US 2020/0378797 A1   Dec. 3, 2020

(30) Foreign Application Priority Data

Jun. 3, 2019   (EP) .................................... 19177921

(51) Int. Cl.
  *G01D 5/14* (2006.01)
  *F16M 13/02* (2006.01)
  *G01F 23/284* (2006.01)

(52) U.S. Cl.
  CPC ............. *G01D 5/145* (2013.01); *F16M 13/02* (2013.01); *G01F 23/284* (2013.01)

(58) Field of Classification Search
  CPC ..... F16M 13/02; F16M 13/022; G01F 23/284
  See application file for complete search history.

(56) References Cited

U.S. PATENT DOCUMENTS

| 7,075,480 B2 | 7/2006 | Fehrenbach et al. |
| 2007/0181764 A1* | 8/2007 | Fehrenbach ........... F16M 13/02 248/300 |

FOREIGN PATENT DOCUMENTS

| DE | 10 2008 025 863 A1 | 12/2009 |
| DE | 10 2012 203 400 A1 | 9/2013 |
| DE | 10 2015 122 177 A1 | 6/2017 |
| EP | 1 493 003 A1 | 1/2005 |
| WO | WO 03/085365 A1 | 10/2003 |

OTHER PUBLICATIONS

Extended European Search Report dated Nov. 22, 2019 in Patent Application No. 19177921.4, 7 pages.

* cited by examiner

*Primary Examiner* — Noam Reisner
(74) *Attorney, Agent, or Firm* — Oblon, McClelland, Maier & Neustadt, L.L.P.

(57) ABSTRACT

A mounting system for a field device is provided, including at least one field device including a first housing part; at least one mounting adapter including a second housing part configured to captively receive the first housing part, the first housing part including at least one mount and/or the second housing part includes at least one mount, the mount being disposed such that the field device is engageable with the second housing part in a first orientation and with the second housing part in a second orientation.

19 Claims, 4 Drawing Sheets

FIELD DEVICE WITH MOUNTING ADAPTER

REFERENCE TO RELATED APPLICATIONS

The present application claims the priority of the European patent application No. 19177921.4, filed on Jun. 3, 2019, which is fully incorporated by reference in the present document.

TECHNICAL FIELD

The present invention relates to a mounting system for a field device comprising a field device and a mounting adapter, the use of a mounting adapter in such a system, and the use of a field device in such a system.

BACKGROUND

Field devices are often used in process automation and the process industry to monitor and determine one or more process variables or other measured values. For example, field devices can be used to determine a pressure of a medium, a level of a medium, a flow rate of a medium, a flow velocity of a medium, a temperature or other process variables. Field devices are increasingly being integrated into networks and connected to computers, smartphones, laptops, or similar devices. These connected field devices may transmit measurement, parameterization or diagnostic data to computer, evaluation, or visualization units.

The housings of such field devices are usually adapted to a specific mounting situation. A different mounting situation means that the housing must be adapted to such a mounting situation in order to provide optimum positioning of the field device. In practice, field devices are arranged outside a container, for example on a container wall or on a ceiling above a container, or inside a container. With the solutions used up to now, the orientation or alignment of the measuring units provided in the field devices can also change here, depending on whether the field device is arranged on a container wall, mounted on the ceiling, or inside a container.

In this connection, it has now become apparent that there is a further need to simplify the installation of a field device or adaptation to a particular mounting situation. It is therefore the object of the present invention to provide a simpler possibility for the installation of a field device. Furthermore, it is the object of the present invention to provide a simple possibility to avoid or at least simplify an otherwise necessary adjustment of the alignment of the measuring units provided in the field devices.

These and other objects, which are mentioned in the following description or can be recognized by the skilled person, are solved by the subject of the independent claims. The dependent claims further elaborate the basic idea of the present invention in a particularly advantageous way.

SUMMARY

A mounting system for a field device is provided according to the present invention, comprising: at least one field device comprising a first housing member; at least one mounting adapter comprising a second housing member for captively receiving the first housing member; wherein the first housing member comprises at least one mounting means and/or the second housing member comprises at least one mounting means; wherein the mounting means are arranged such that the field device is engageable in a first orientation with the second housing member and in a second orientation with the second housing member.

A field device according to the present invention is understood to be any unit used for monitoring and detecting one or more process variables and is not limited to certain field devices as long as these field devices can be used in different mounting/installation situations.

According to the present invention, at least on one of the two parts of the housing, a mounting adapter is arranged in such a way that the field device can be arranged in at least two orientations in or on the mounting adapter in a loss-proof manner. In other words, the present invention proposes to provide a system with a mounting adapter to which the field device or the housing of the field device can be attached in at least two different orientations so that first the mounting adapter can be mounted, for example, on a container wall or in ceiling mounting, and then the alignment or orientation of the field device can be adapted accordingly to the mounting situation by means of the different arrangement possibilities of the field device on or in the mounting adapter. In this respect, it should be noted that the present invention is not limited to a certain installation situation, in particular, a mounting system according to the present invention can be used on a container, outside a container, inside a container, on a ceiling, on a pipe arrangement or in a channel or the like. Furthermore, the present invention is not limited to a certain number of mounting devices or to their concrete arrangement on the field device and/or on the mounting adapter. In this context, it is only of importance that the mounting means allow a more loss-free arrangement of the field device on or in the mounting adapter in at least two orientations.

In a first alternative embodiment of the present invention, both housing members may each comprise a correspondingly formed and arranged mounting means which can be engaged with each other. In a further alternative embodiment of the present invention, both housing members may each be provided with two mounting means which are each engageable with two mounting means of the other housing member. The only important aspect here is that the mounting means enable at least two different alignments or orientations of the field device on the mounting adapter.

In a further embodiment, either the first or the second housing member may comprise first mounting means and second mounting means, the other housing member then comprising third mounting means such that the third mounting means is engageable with the first mounting means in a first orientation of the field device and with the second mounting means in a second orientation of the field device. In this context, it is further preferred that the first mounting means and the second mounting means be provided on the first housing member and the third mounting means be provided on the second housing member. In other words, it is further preferred in this context that at least two mounting means are provided on the field device or on the housing of the field device, respectively, which are each engageable with the third mounting means of the mounting adapter, i.e., the third mounting means of the mounting adapter is engageable with the first mounting means of the field device in a first positioning or orientation of the field device and with the second mounting means of the field device in a second positioning or orientation of the field device.

Advantageously, the first and second mounting means are arranged on opposite sides of the first housing member. In this context it is further preferred that the mounting means are located in corner areas of the first housing member and/or in corner areas of a receptacle of the second housing member. In this preferred embodiment, the housing of the field device thus comprises two mounting means, which are preferably provided in the corner areas of the housing of the field device in such a way that the field device can be inserted into a receptacle of the mounting adapter and the respective mounting means of the field device can interact with the mounting means of the mounting adapter. Alternatively, the mounting means can also be provided all around on or in the housing members.

Furthermore, it is preferred that the first and second mounting means are arranged mirror-symmetrically with respect to one plane so that the field device can be arranged on the second housing member rotated by 180° DEG in the first orientation compared to the second orientation. By such an arrangement of the mounting means, the orientation of the field device or the measuring unit provided in the field device can be adapted to different mounting situations, for example, installation on a container and installation in ceiling mounting. Installation situations often differ in that the field device must be arranged rotated by 180° DEG, for example when mounted on a container and when mounted on a ceiling, for example above a container (ceiling mounting). Furthermore, it is preferred that the housing of the field device is essentially symmetrical with respect to a plane around which the field device can be rotated for the different alignments or arrangements in the mounting adapter. In this context, however, the housing of the field device does not have to be completely symmetrical, but only with regard to the respective surfaces and mounting means that can be brought into contact. In this context, it should be noted that mirror-symmetrical, rotationally symmetrical, or other symmetries are only particularly preferred designs. However, such symmetry is not necessary for the realisation of the present invention as long as the mounting means allow a loss-free arrangement of the field device on or in the mounting adapter in at least two orientations.

Preferably, the mounting means are provided in the form of corresponding snap-in connections, bayonet connections, snap-on connections, tongue-and-groove connections, circumferential connections, or screw connections. In this context, it is also preferred to use detachable connections, i.e., connections that allow the field device to be detached from the mounting adapter. Furthermore, it is advantageous that the connections used allow the mounting adapter to be first attached to a mounting position and then the field device to be connected to the mounting adapter. In addition, it is also possible to use different mounting means/elements or similar in a mounting system, as long as this allows a captive arrangement of the field device on or in the mounting adapter in at least two orientations.

Advantageously, a respective mounting means comprises at least two mounting elements, which are preferably arranged opposite each other. In other words, it is preferable that a mounting means is provided, for example, by two snap or snap-in connections arranged in opposite corner areas of one of the housings. The mounting elements used can be point-acting connections, as in the case of screw connections, or linear acting connections, as in the case of an elongated snap-in connection or tongue-and-groove connection. Alternatively or in addition, a mounting means may, however, also comprise only one centrally arranged mounting element, for example a snap-on connection, a screw connection or the like, if this allows a captive arrangement of the field device on or in the mounting adapter in at least two orientations.

Preferably, the first housing member of the field device can be accommodated in the second housing member of the mounting adapter in such a way that both housing members form a common base surface when connected, the base surface formed being a planar surface or a curved surface. In this connection it is further preferred that the field device is received in a receptacle of the mounting adapter in such a way that the field device can be arranged more or less completely in the receptacle of the mounting adapter and the mounting adapter and the field device form at least one common base surface. This base surface can advantageously be used as a contact surface in order to arrange the mounting adapter or the field device on a container, for example, and to mount it there. The geometry of the base surface is preferably adapted to the geometry of the respective location. If, for example, the mounting system is to be arranged on a flat surface of a vessel, it is preferred that the base surface is correspondingly planar, whereas if the mounting system is to be arranged on a curved surface, for example on a pipeline, it is preferred that the base surface is a correspondingly curved surface. The mounting system or the mounting adapter can be fastened at the installation site by means of cable ties, belts, straps or other fasteners, for example. Alternatively or additionally, it is possible to fix the mounting system or the mounting adapter to an installation location, for example to a surface of a container, by means of an adhesive, screw or welded connection.

Advantageously, the field device includes a position or orientation detection unit, set up to determine whether the field device is arranged in the first or second orientation on the second part of the housing, for example. This makes it possible to take the respective orientation of the mounting system or the field device into account, preferably automatically, when evaluating the signal. This is particularly advantageous for the typical positioning of the mounting system on a vessel or in ceiling mounting, since the orientation of the field device typically differs in these two positions. In this case, the orientation of the field device on or in the mounting adapter can be used to determine whether the mounting system is mounted on a container or on the ceiling, so that (automatic) signal evaluation can take into account whether or not an emitted signal is guided through an adjacent (container) wall. Thus, the respective signal path can be taken into account accordingly in the signal processing, so that possible misinterpretations can be avoided. In this context, it is preferable that the position detection unit includes, for example, a reed contact or a Hall sensor which is set up to interact with a magnetic unit arranged on the mounting adapter in order to determine the orientation of the field device. Both of these sensors provide a simple and reliable way of determining the orientation of the field device in or on the mounting adapter, and preferably also how the mounting system is mounted.

Preferably, the field device is a fill level measuring unit arranged to determine a fill level based on a transit time measurement of a signal emitted and reflected to the fill level measuring unit, preferably a radar signal or a microwave signal. In this context, it is further preferred that the field device is arranged to take into account during signal evaluation whether the field device is arranged in the first or second orientation. Especially when the field device is designed as a fill level measuring unit, it is preferred that the alignment of the field device is taken into account during signal evaluation. Accordingly, it is particularly preferred that a first orientation of the field device is provided for an arrangement of the fastening system on a container and a second orientation of the field device is provided for an arrangement of the mounting system in ceiling mounting.

Further, the present invention relates to a use of a mounting adapter comprising a housing member for captively receiving a housing member of a field device in a system described above. Finally, the present invention also relates to a use of a field device comprising a housing member for loss-proof reception in a housing member of a mounting adapter in a system described above.

BRIEF DESCRIPTION OF THE DRAWINGS

A detailed description of the figures is given below. It shows.

DETAILED DESCRIPTION OF EMBODIMENTS

Figure 1:
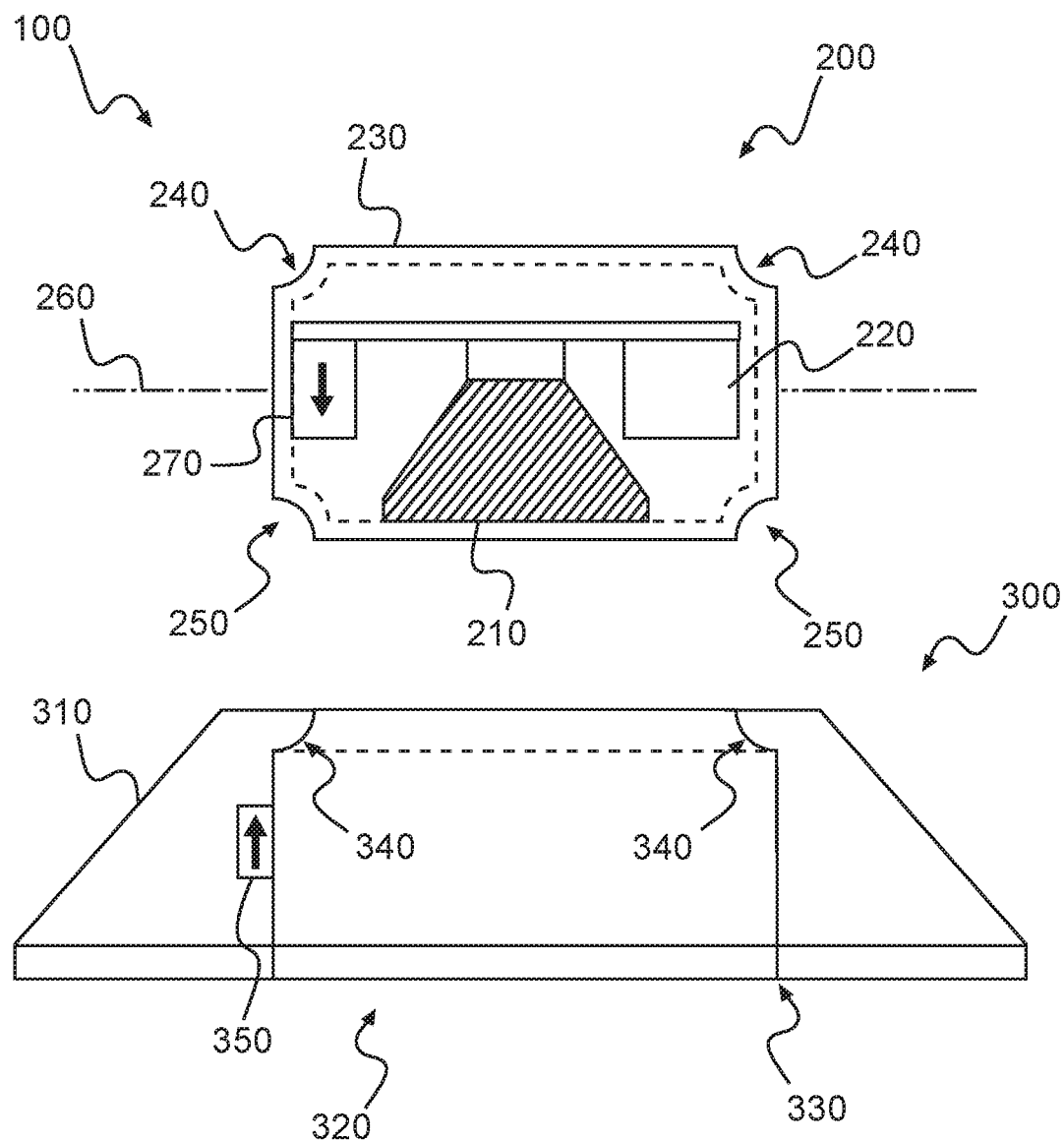
FIG. 1 shows a schematic view of a mounting system according to a first preferred embodiment comprising a field device and a mounting adapter, the mounting adapter in this embodiment comprising two mounting means and the field device comprising one mounting means.

FIG. 1 shows a schematic view of a mounting system 100 comprising a field device 200 and a mounting adapter 300.

The field device 200 is designed in the particularly preferred embodiment shown as a fill level measuring unit and comprises a signal acquisition unit 210, a signal evaluation unit 220, the signal acquisition unit 210 being set up to determine a filling level based on a transit time measurement of a signal emitted by the signal acquisition unit 210 and reflected back onto it, preferably a radar signal or a microwave signal being used as the signal.

Furthermore, the field unit 200 comprises a housing member 230, in which the respective units are arranged or fixed. Furthermore, the housing member 230 comprises two mounting elements 240, which together form a first mounting means, and which are provided at upper opposite sides or corner areas of the housing member 230. The housing member 230 further comprises a second mounting means provided by two mounting elements 250 which together form a second mounting means and which are provided on lower opposite sides or corner areas of the housing member 230. As can be seen in FIG. 1, the housing part 230 is essentially mirror-symmetrical to a plane 260, i.e., when the housing part 230 or the field device 200 is rotated by 180° DEG, the upper mounting elements 240 (first mounting means) can be brought into the position of the lower mounting elements 250. Finally, the field device 200 in the shown particularly preferred embodiment also includes a position detection unit 270 in the form of a reed contact or a Hall sensor to determine an alignment of the field device 200 on or in the mounting adapter 300. Alternatively, the mounting elements 240, 250 can also be designed as circumferential mounting elements 240.

The mounting adapter 300 comprises a housing member 310 on or in which a receiving area 320 is provided in which the field device 200 can be arranged, i.e., the geometry of the receiving area 320 of the mounting adapter 300 is designed or dimensioned in such a way that the housing member 230 of the field device 200 can be arranged in the receiving area 320, it being preferred that the housing member 230 of the field device 200 can be completely inserted into the receiving area 320 so that the two housing members 230, 310 form at least one common base surface 330. The housing part 310 further comprises a third mounting means in the form of two opposing mounting elements 340 which are designed in such a way that they can be engaged with the mounting means 240, 250 of the field device 200 in a captive manner. The mounting elements 340 are arranged in opposite corner areas of the receiving area 320. In a first orientation of the field device 200, the first mounting means 240 can be engaged with the third mounting means 340 and in a second orientation of the field device 200, the second mounting means 250 can be engaged with the third mounting means 340. In the particularly preferred design shown, the first orientation of the field device 200 is rotated by 180° DEG in comparison to the second orientation of the field device 200, with which the field device 200 can be positioned or fastened in the receiving area 320 in the mounting adapter 300.

Furthermore, the mounting adapter 300 comprises a magnet unit 350, which is designed to interact with the position detection unit 270 of the field device.

In this context, it should be noted that the first and second mounting means 240, 250 in an alternative embodiment could also be provided on the mounting adapter 300, in which case the third mounting means 340 would be provided on the field device 200. Furthermore, it is possible to provide the position detection unit 270 in the mounting adapter 300 instead of in the field device 200. In this case, the corresponding magnet unit 350 would have to be provided on the field device 200.

Figure 2:
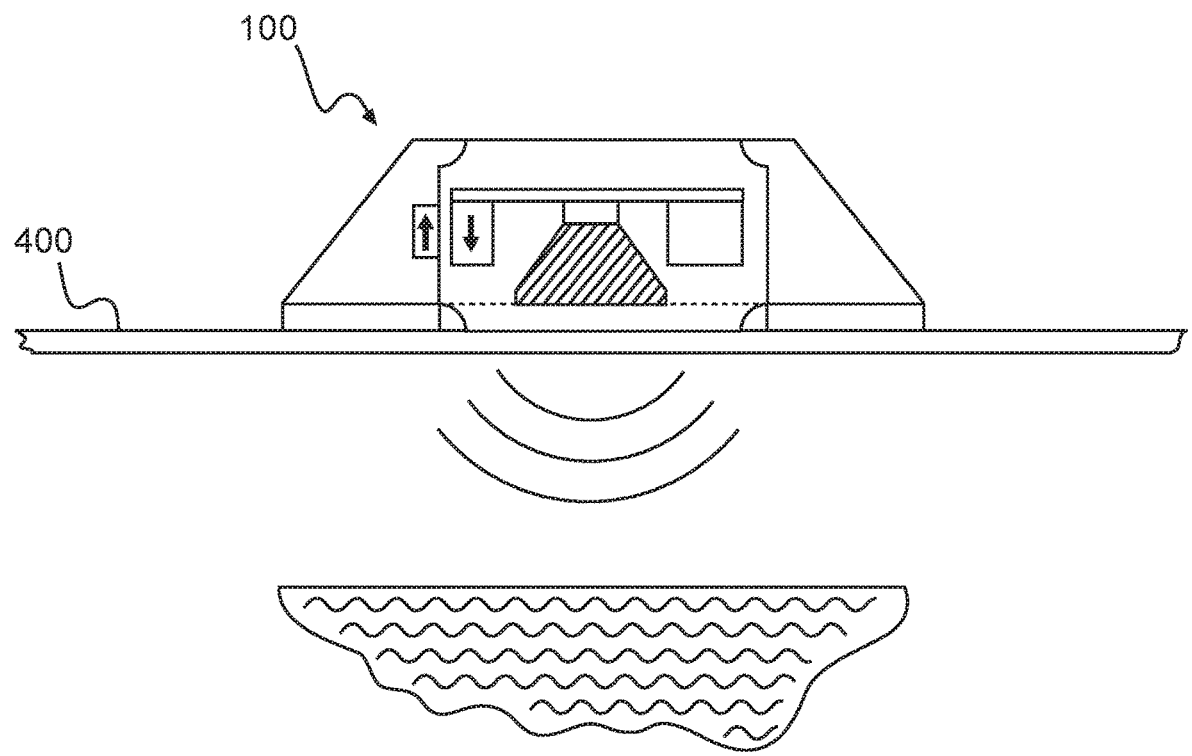
FIG. 2 shows a schematic view of the mounting system shown in FIG. 1 in a first installation situation with a first orientation of the field device in the mounting adapter.

FIG. 2 shows the mounting system 100 from FIG. 1 in a first installation situation. In this situation, the mounting system 100 is located outside a container on an outer surface/wall 400 of the container. In the arrangement shown, the field device 200 is arranged in the receptacle 320 of the fastening adapter 300 in such a way that both housing members 230, 310 form a common, flat base surface 330. At this base surface 330 the mounting system 100 is mounted to the outer surface 400, whereby such a mounting can be done for example by means of an adhesive bond, a welded joint, a double-sided adhesive tape, or similar. By means of the position detection unit 270 and the magnetic unit 350 interacting with this, it can be determined in which alignment or orientation the field device 200 is arranged in the mounting adapter 300, and that the mounting system 100 is arranged on an outer surface 400 of a container, so that this can be taken into account by the signal evaluation unit 220.

Figure 3:
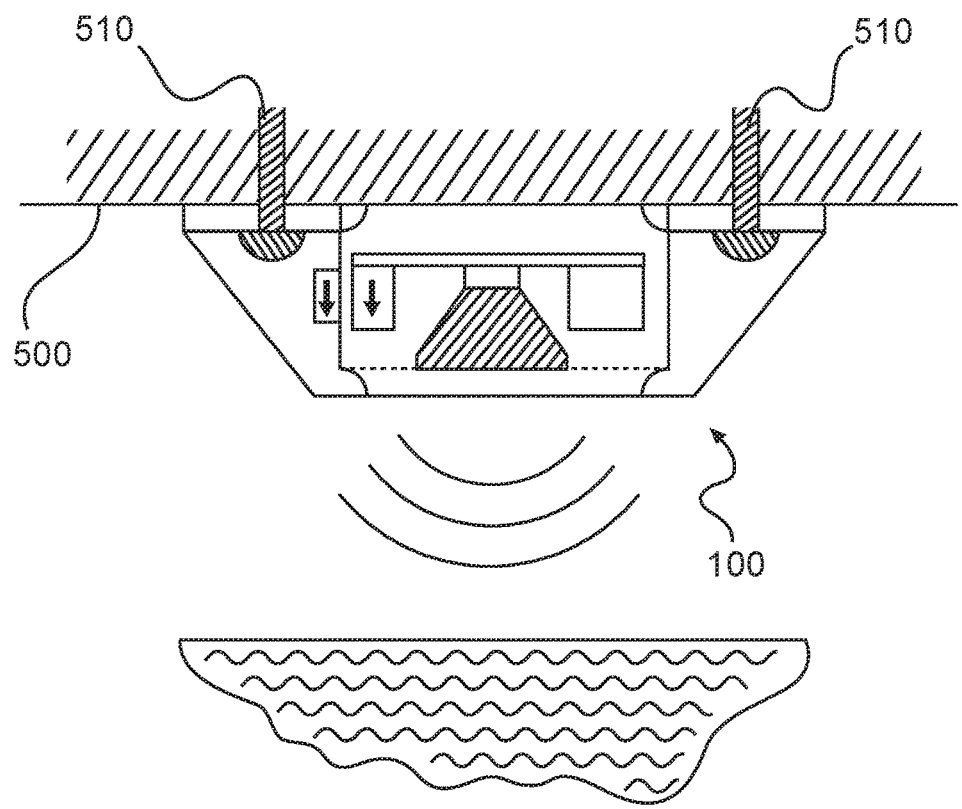
FIG. 3 shows a schematic view of the mounting system shown in FIG. 1 in a second installation situation with a second orientation of the field device in the mounting adapter.

FIG. 3 shows the mounting system 100 from FIG. 1 in a second installation situation. In this situation the mounting system 100 is placed, for example, on a ceiling above a container on a surface 500. Again, the field device 200 is arranged in the receptacle 320 of the mounting adapter 300 in such a way that both housing members 230, 310 form a common, flat base surface 330. The mounting system 100 is mounted with the base surface 330 on the inner surface 500, whereby such a mounting is provided here by means of corresponding screw connections 510. Again, the position detection unit 270, which interacts with the magnet unit 350, can determine in which orientation the field device 200 is arranged in the mounting adapter 300, and therefore that the mounting system 100 is arranged in ceiling mounting, so that this can in turn be taken into account by the signal evaluation unit 220, i.e., no wall or the like is arranged in the vicinity of the field device 200 in the measuring section.

Figure 4:
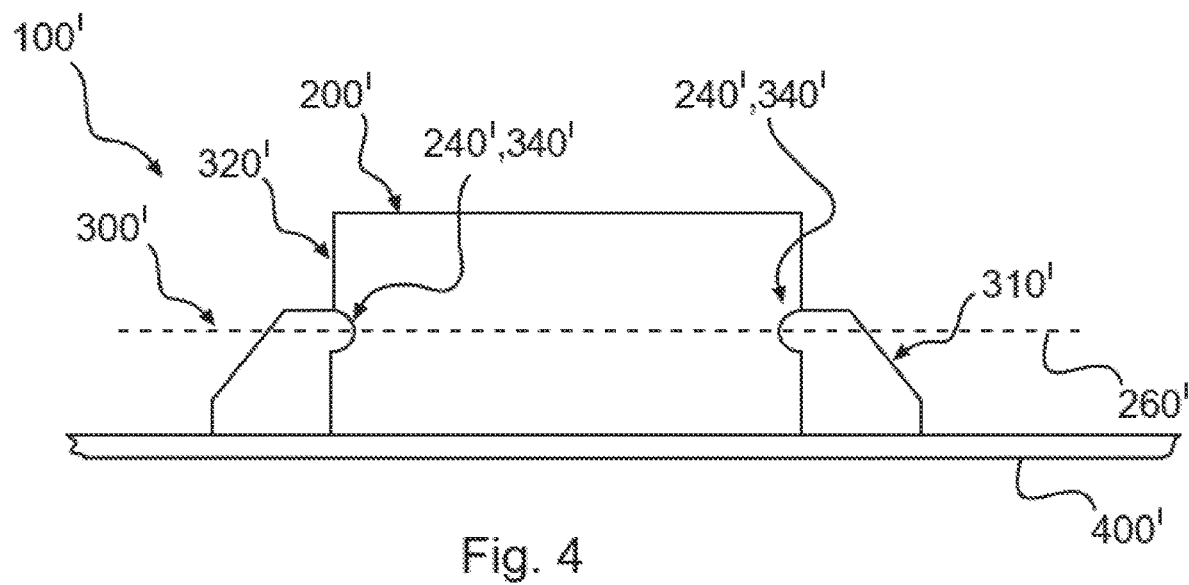
FIG. 4 shows a schematic view of a mounting system according to a second preferred embodiment comprising a field device and a mounting adapter, wherein the field device and the mounting adapter in this embodiment comprise only one mounting means each.

FIG. 4 shows a schematic view of a mounting system 100', which is exemplarily arranged on an outer surface/wall 400' of a container, according to a second preferred embodiment with a field device 200' and a mounting adapter 300', whereby in contrast to the above embodiment, the field device 200' and the mounting adapter 300' in this embodiment each comprise only one mounting means 240' 340'. With regard to the explanations of the respective parts, reference is also made to the above explanations. The mounting adapter 300' also includes a receiving area 320' in which the field device 200' can be mounted in two orientations. As can be clearly seen in FIG. 4, the mounting adapters 240', 340' are arranged approximately centrally on the housing members, for example on a central plane of symmetry 260'. The mounting means 240', 340' can be provided here for example by means of a snap-in, snap connection, a circumferential connecting means, or similar, whereby the present invention is not limited to a concrete mounting means 240', 340' here either, provided that the field device 200' can again be arranged in two orientations in or on the mounting adapter 300' in a loss-proof manner.

Figure 5:
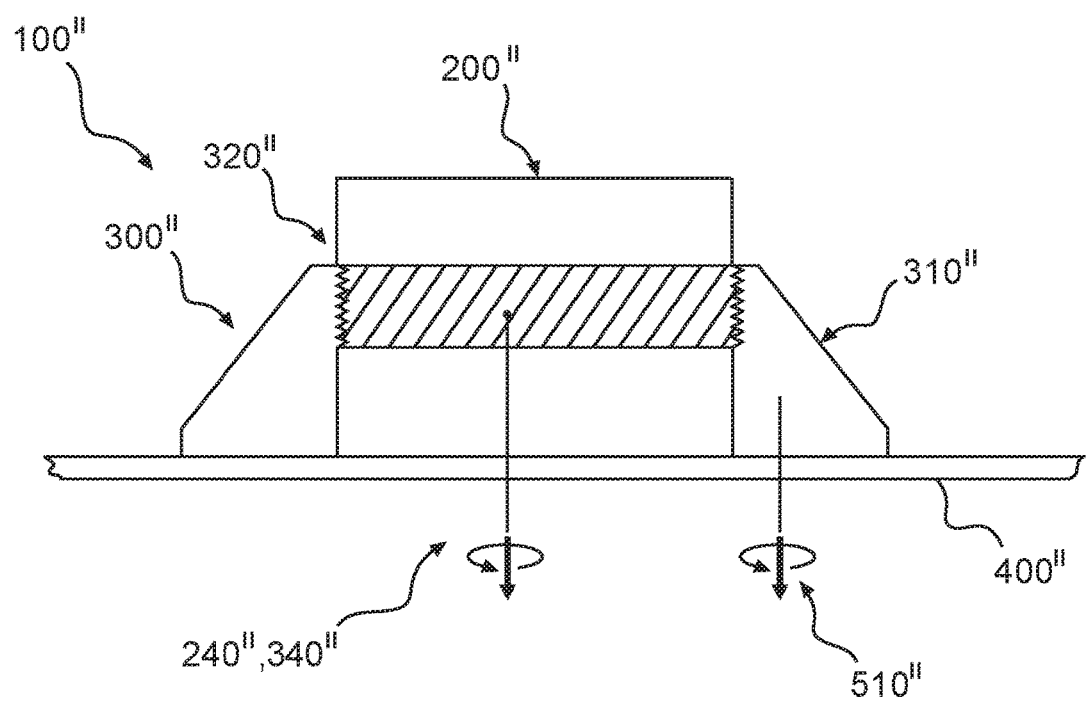
FIG. 5 shows a schematic view of a mounting system according to a third preferred embodiment comprising a field device and a mounting adapter, wherein mounting of the field device to the mounting adapter in this embodiment is done with only one mounting means.

FIG. 5 shows a schematic view of a mounting system 100" according to a third preferred embodiment with a field device 200" and a mounting adapter 300", the mounting system 100" being in turn exemplarily arranged on a wall 400" of a container. With regard to the explanations of the respective parts, reference is again made to the above explanations. The mounting adapter 300" comprises a receiving area 320" in which the field device 200" can be mounted in two orientations. As can be clearly seen in FIG. 5, the mounting means 240', 340' here is provided by a screw connection as an example, so that the field device 200" can be screwed to the mounting adapter 300" and/or to the wall 400" in two orientations. To fasten the mounting adapter 300", for example, it can also be fastened to the wall 400" on one side only, here for example by a screw connection 510".

Figure 6:
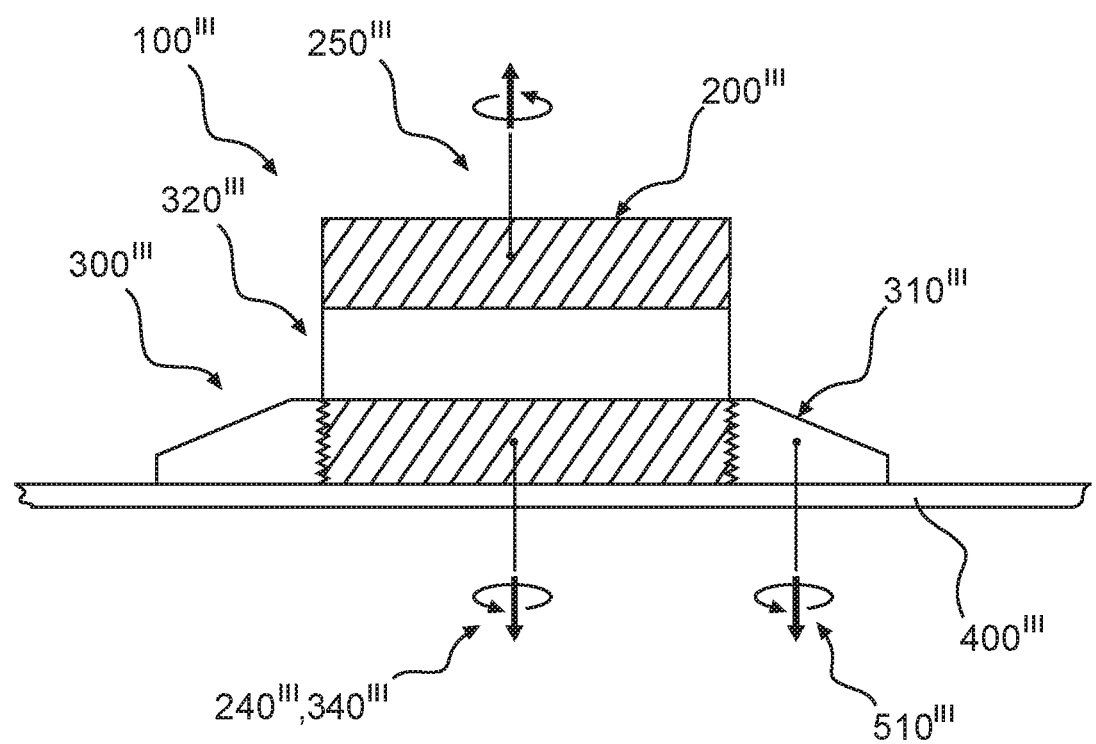
FIG. 6 shows a schematic view of a mounting system according to a fourth preferred embodiment comprising a field device and a mounting adapter, whereby a mounting of the field device to the mounting adapter in this embodiment is effected with two mounting means.

FIG. 6 shows a schematic view of a mounting system 100''' according to a fourth preferred embodiment with a field device 200''' and a mounting adapter 300''', the mounting system 100''' again being exemplarily arranged on a wall 400''' of a container. With regard to the explanations of the respective parts, reference is again made to the above explanations. The mounting adapter 300''' comprises a mounting/receiving area 320''' in which the field device 200''' can be mounted in two orientations. As can be clearly seen in FIG. 6, the mounting means 240''', 340'. 250''' are provided here as an example by two screw connection options, i.e., in a first orientation the field device 200''' can be rotated by 180° DEG with a first screw connection 240''', 340''' and in a second position the field device 200''' can be rotated by 180° DEG and mounted with a second screw connection 250''', 340''' on the mounting adapter 300''' and/or on the wall 400'''. In the implementation example shown here, the mounting adapter 300" is again mounted on one side to the wall 400''', here for example with a screw connection 510'''.

It should be noted that the present invention is not limited to the use of a specific field device 100 in combination with a mounting adapter 200. However, the present invention is particularly preferred to be used with a field device 100 in the form of a fill level measuring device which determines a fill level based on a transit time measurement of a radiated signal reflected onto the fill level measuring unit. This is based in particular on the fact that such level measuring units are typically arranged on a container on an outer surface/wall or above a container in ceiling mounting. Furthermore, the present invention is not limited to the previously shown preferred embodiments as long as they are covered by the subject matter of the following claims, in particular the present invention is not limited to a certain number of mounting/fastening means or to their concrete arrangement on the field device and/or on the mounting adapter. Also, no specific symmetry of the field device, the mounting adapter or the arrangement of the mounting means on the respective housing parts is necessary for the realization of the present invention. Also, the position of the mounting means may vary and is not limited to the opposite edges of the housing. In this context, it is only of importance that the mounting means allow a more loss-free arrangement of the field device on or in the mounting adapter in at least two orientations. Furthermore, the skilled person recognizes that respective parts of the above implementation examples can also be combined with and/or among each other, depending on the specific application requirements.

REFERENCE LIST 100 mounting system
200 field device
210 signal acquisition unit
220 signal evaluation unit
230 first housing member
240 first mounting elements (first mounting means)
250 second mounting elements (second mounting means)
260 plane of symmetry
270 position detection unit
300 mounting adapter
310 second housing member
320 receiving area/receptacle
330 common base surface area
340 third mounting elements (third mounting means)
350 magnetic unit
400 external surface of a container
500 inner surface of a container
510 screw connections

The invention claimed is:

1. A mounting system for a field device, comprising:
at least one field device comprising a first housing part; and
at least one mounting adapter comprising a second housing part configured to captively receive the first housing part,
wherein the first housing part comprises at least one mounting means and/or the second housing part comprises at least one mounting means,
wherein the mounting means are disposed such that the at least one field device is engageable with the second housing part in a first orientation and with the second housing part in a second orientation, and wherein the at least one field device further comprises a position detection unit configured to determine whether the at least one field device is disposed in the first or the second orientation on the second housing part.

2. The mounting system of claim 1,
wherein the first housing part comprises a first mounting means and the second housing part comprises a second mounting means, and
wherein the first mounting means is engageable with the second mounting means in a first orientation of the at least one field device and with the second mounting means in a second orientation.

3. The mounting system of claim 1,
wherein one of the first and the second housing parts comprises first mounting means and second mounting means, and the other of the first and the second housing parts comprises third mounting means, and
wherein the third mounting means is engageable with the first mounting means in a first orientation of the at least one field device and with the second mounting means in a second orientation of the at least one field device.

4. The mounting system of claim 3, wherein the first mounting means and the second mounting means are provided on the first housing part and the third mounting means is provided on the second housing part.

5. The mounting system according to claim 3, wherein the first and the second mounting means are disposed on opposite sides of the first housing part.

6. The mounting system according to claim 5, wherein the first and the second mounting means are disposed in corner areas of the first housing part and/or in corner areas of a receptacle of the second housing part.

7. The mounting system according to claim 3, wherein the first and the second mounting means are disposed mirror-symmetrically with respect to a plane so that the at least one field device can be arranged on the second housing part rotated by 180° DEG in the first orientation compared to the second orientation.

8. The mounting system according to claim 3, wherein the third mounting means are provided as corresponding snap-in connections, bayonet connections, snap-on connections, tongue-and-groove connections, and/or screw connections.

9. The mounting system according to claim 1, wherein the first and the second mounting means are provided as corresponding snap-in connections, bayonet connections, snap-on connections, tongue-and-groove connections, and/or screw connections.

10. The mounting system according to claim 1, wherein a respective one of the first and the second mounting means comprises at least two oppositely disposed mounting elements.

11. The mounting system according to claim 1, wherein the first housing part of the at least one field device is configured to be received in the second housing part of the mounting adapter such that both housing parts form a common base surface in the connected state.

12. The mounting system according to claim 11, wherein the common base surface formed is a planar surface or a curved surface.

13. The mounting system according to claim 1, wherein the position detection unit comprises a reed contact or a Hall sensor configured to interact with a magnet unit disposed on the mounting adapter to determine an orientation of the at least one field device.

14. The mounting system according to claim 1, wherein the at least one field device is a fill level measuring unit configured to determine a fill level based on a transit time measurement of a signal emitted and reflected to the fill level measuring unit.

15. The mounting system according to claim 14, wherein the signal emitted and reflected is a radar signal or a microwave signal.

16. The mounting system according to claim 1, wherein the at least one field device is configured to take into account in a signal evaluation whether the at least one field device is arranged in the first or the second orientation.

17. The mounting system according to claim 1, wherein an orientation of the at least one field device is provided for an arrangement of the mounting system inside a container and another orientation of the at least one field device is provided for another arrangement of the mounting system outside of or on a container.

18. A mounting adapter comprising a housing part configured to captively receive a housing part of a field device in a system according to claim 1.

19. A field device comprising a housing part configured to captively receive a housing part of a mounting adapter in a system according to claim 1.

* * * * *